United States Patent [19]
Canedy

[11] Patent Number: 5,701,122
[45] Date of Patent: Dec. 23, 1997

[54] ELECTRONIC CURB FEELER

[76] Inventor: Thomas Canedy, 317 D. 26th St., Ft. Eustis, Va. 23604

[21] Appl. No.: 726,201

[22] Filed: Oct. 4, 1996

[51] Int. Cl.$^6$ .................. B60Q 1/48; G08G 1/14
[52] U.S. Cl. .......... 340/932.2; 340/903; 340/435; 340/436; 340/437
[58] Field of Search ................. 340/932.2, 903, 340/435, 436, 437, 474, 467, 479, 984, 904; 180/167, 169

[56] References Cited

U.S. PATENT DOCUMENTS

| | | | |
|---|---|---|---|
| 2,317,652 | 4/1943 | Toney | 340/932.2 |
| 3,491,334 | 1/1970 | Martin | 340/904 |
| 3,842,397 | 10/1974 | Sindle | 340/904 |
| 4,240,152 | 12/1980 | Duncan et al. | 340/904 |
| 4,349,823 | 9/1982 | Tagami et al. | 340/904 |
| 4,447,800 | 5/1984 | Kasuya et al. | 340/903 |
| 4,626,850 | 12/1986 | Chey | 340/903 |

*Primary Examiner*—Jeffery Hofsass
*Assistant Examiner*—Sihong Huang
*Attorney, Agent, or Firm*—Jay Wenzel

[57] ABSTRACT

An electronic curb feeler system uses two pairs of optical sensor units to detect an object located near the front end of a vehicle during parking. One pair of optical sensor units detects an object directly in front of a left portion of the front end of the vehicle while another pair of optical sensors detects an object directly in front of a right portion of the front end of the vehicle. By supplying the operator of the vehicle with the location of the object as well as the exact distance the object is from the front end of the vehicle the operator can avoid hitting the object while parking very close to the object.

2 Claims, 2 Drawing Sheets

ELECTRONIC CURB FEELER

BACKGROUND OF THE INVENTION

1. Field of the Invention

The present invention relates to a device for indicating the distance from a cars bumper or spoiler to a solid object, such as a curb or divider, while parking the car.

2. Description of Prior Art

Distance-from-object warning devices for automobiles are known, but these do not have the advantageous features of the instant invention. More particularly, the device of the present invention provides an audio and visual warning signal to the operator of the car when a solid object gets too close to the bumper or spoiler and also provide a digital readout of the distance the object is from the car. The digital readout normally displays a clock, but when the vehicle slows to approximately two or three miles per hour and/or senses or detects an object at about eighteen inches then the display converts to a distance-from-object-detected display (in inches). When the device senses an object at about ten inches from the spoiler a loud and continuous beep will be emitted from the audible warning unit. When the device senses an object at about six inches from the spoiler a steady alarm will sound and the digital readout will display the word "STOP" below the distance-from-object-detected display.

Audible and/or visual warning indicators used in vehicles, and which are activated when a solid object is too close to a section of the vehicle are known in the prior art. Such indicators are activated when a threshold distance is reached between the section of the vehicle and the solid object. These known devices use various schemes for detecting the threshold distance.

U.S. Pat. No. 2,317,652 issued Apr. 28, 1941, to Toney, discloses an electronic eye curb indicator to facilitate the parking of a vehicle. A light beam is illuminated downward at an angle from the fender of the car so as to illuminate the curb or object close by. A detector, located a predetermined distance from the light source of the light beam, is angled to detect the light beam which reflects off the solid object when that object is at a predetermined distance. The detector then activates a relay which sounds an audible and/or visual warning signal to the driver.

U.S. Pat. No. 3,491,334 issued Jan. 20, 1970, to Martin, discloses an electronic eye warning indicator system for detecting the distance of a solid object directly in front of and directly behind a vehicle. Each of the two light sources shines a light beam at a predetermined angle from the vehicle. When a solid object is a predetermined distance from the vehicle, the light beam reflects off the object and into a light detector attached a predetermined distance from the light source. The distance between the light source and the light detector, as well as the angle that the light beam is emitted, determine the predetermined distance from the vehicle the solid object would be detected. Once a solid object is detected at the predetermined distance, a warning signal is sounded.

U.S. Pat. No. 3,842,397 issued Oct. 15, 1974, to Sindle, discloses an audible and visual warning system for alerting the operator of the car when a solid object is too close. Sindle uses ultrasonic sound in his device to detect the distance to the object.

U.S. Pat. No. 4,349,823 issued Sep. 14, 1982, to Tagami et al., discloses a car radar monitoring system which detects the distance of a solid object around the car. A visual display uses a plurality of segments to give a visual indication of the range of the object in discrete intervals.

U.S. Pat. No. 4,447,800 issued May 8, 1984, to Kasuya et al., discloses an obstacle detector using a light emitting element and a light receiving element to determine the distance the object is from the vehicle, the relative speed of the object with respect to the vehicle, etc., and outputs an alarm if necessary.

None of the above inventions and patents, taken either singly or in combination, is seen to describe the instant invention as claimed.

SUMMARY OF THE INVENTION

In the present invention, the operator of the car is given varying visual and audible information as to the location and exact distance of a solid object in the proximity of the front spoiler, bumper, or finder during parking.

Accordingly, it is a principal object of the invention to provide an indication of the distance between a solid object and the front bumper or spoiler to the operator of the vehicle in inches. In most states, when front end parking the vehicle's tires have to be within a certain amount of feet from the curb or the car may be ticketed for being parked in the road. Also many parking spaces are so small that if the parked car is not completely within the parking space, the rear end of the car sticks out, thus increasing the chances of the car being hit by a passing car. (The principles of the instant invention could also be applied to the side of the car, for parallel parking, to control accurately distance from the curb.)

It is another object of the invention to provide the operator with an accurate determination of the location of a potentially dangerous solid object.

It is a further object of the invention to provide an audible warning signal when the solid object is within a predetermined distance range to the front bumper, spoiler.

It is yet a further object of the invention to provide a digital clock display which, when the vehicle reaches a predetermined slow speed (e.g., 2 or 3 mph or so), is converted to a distance-in-inches display and, eventually, a beeping alarm, and finally a red LED display announcing "STOP" and a steady alarm, all to guide the operator to a safe parking distance from a curb or other object.

Still another object of the invention is to provide the operator with a digital display of the exact distance of the solid object after the object has reached the predetermined distance and the operator has been audibly warned of the presence of the object.

It is an object of the present invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
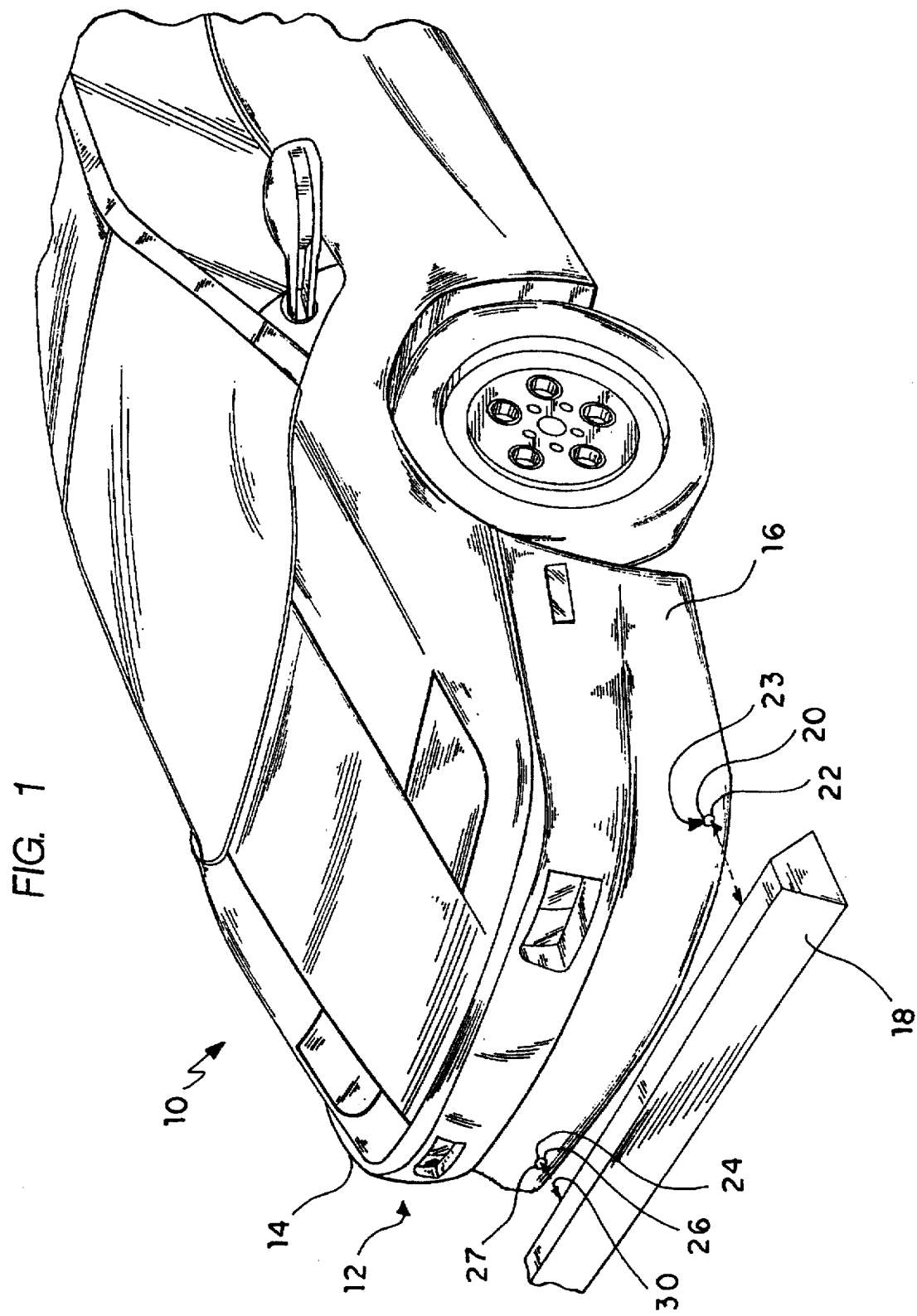
FIG. 1 is environmental perspective view of the present invention.

As shown in FIG. 1, a conventional car 10 has a front bumper portion 12 in which the upper part 14 is the bumper while the lower portion 16 is the spoiler which is integrally formed therewith.

On the left front side of the spoiler 16 is located a pair of optical sensor units 20 and 22. The optical unit 20 is an optical transmitter and the optical unit 22 is an optical detector. The optical sensor units 20 and 22 can detect the distance from the spoiler 16 to a solid object located on the left front side of the car in the proximity of the spoiler 16. The distance is determined in accordance with the output signal of the optical detector 22 when the light from the optical transmitter 20 is reflected back into the optical detector 22. This is accomplished in the same manner as is disclosed by U.S. Pat. No. 4,447,800 issued to Kasuya et al which has been made of record and is incorporated herein by reference.

On the right front side of the car, a second pair of optical sensor units 24 and 26 are used to detect a solid object on the right front side of the car in the proximity of the spoiler 16. Both the right side pair and the left side pair of optical sensor units use one sensor unit to transmit light directly in front of the car at a slight downward angle so that any solid object located in the proximity thereof causes the light to reflect back to the other sensor unit of the pair used to detect the solid object. The optical unit 24 is an optical transmitter and the optical unit 26 is an optical detector used to receive the reflected light from the solid object in the proximity of the spoiler 16 when the reflected light is of the same frequency as the light beam 30 transmitted by the optical transmitter 24 in the same manner as disclosed by Kasuya et al.

Each optical transmitter 20 and 24 are located in close proximity to its respective optical detector 22 and 26 thereby requiring only one mounting hole 23 on the left side of the spoiler 16 and one mounting hole 27 on the right side of the spoiler 16. If a solid object is in front of the spoiler 16 during parking, the operator of the vehicle is notified of the object when it is reaches a predetermined distance, after which the operator is given a visual indication of the distance the object is from the spoiler 16. If a divider 18 is located in front of the car 10 as the operator is front end parking, light beams 28 and 30 will be detected by optical detectors 22 and 26, respectively, when the light beams transmitted by optical transmitters 20 and 24 are reflected off the divider 18.

As disclosed by Kasuya et al., the light beam generated by the optical transmitter is not unidirectional. Therefore, the light reflected off of the solid object which is reflected at an angle necessary to be received by the optical detector varies in intensity as the solid object comes closer to the optical sensor units. This is disclosed by U.S. Pat. No. 2,317,652 issued to Toney, made of record and incorporated herein by reference. Therefore, the distance between the solid object and the optical sensor units can be determined as disclosed by Kasuya et al.

Figure 2:
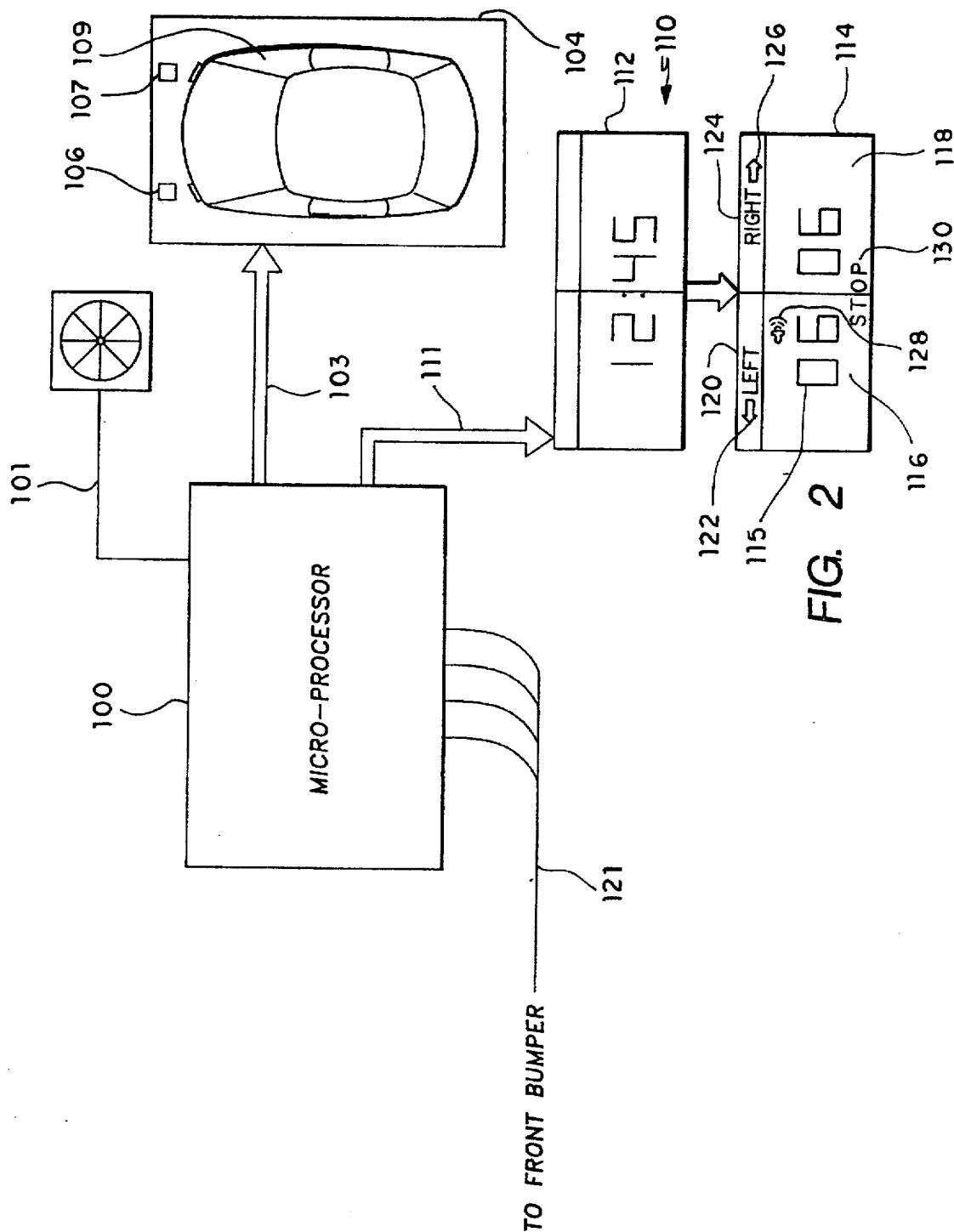
FIG. 2 is a block diagram of the electronic circuitry of the present invention and showing the display unit in both the clock mode and the distance-in-inches mode.

FIG. 2 illustrates the electronic circuitry for accomplishing the detection of the solid object. A microprocessor 100 is used to control the detection process. Bus 120 are used to control the two pairs of optical sensor units, specifically the left and right front pair of optical sensor units. Kasuya et al. discloses in FIG. 1 the circuitry for controlling one pair of optical sensor units. The same components are used for each pair of optical sensor units.

The microprocessor 100 outputs control signals along bus 103 connected to a display 104. If the right front pair of optical sensor units come within eighteen (18) inches of the divider 18 first, the microprocessor 100 controls the display 104 to activate a light 107. The light 107 is located in the right front corner of a silhouette 109 on the display 104. In this manner, the position of the divider 18 is indicated relative to the vehicle. Also, the microprocessor 100 controls a display 110 having a seven segment display array 115, via control bus 111, to indicate on display segment 118 the number of inches from the divider 18 to the right front portion of the spoiler 16. When display segment 118 is activated then a "RIGHT" indicator 124 and right arrow indicator 126 are illuminated.

Similarly, once the left front pair of optical sensor units detect the divider 18 within eighteen (18) inches, the microprocessor 100 causes the display 104 to activate the light 106 as well as the light 107, via control signals 103. Also, the display segment 116, via control bus 111, is caused to display the distance in inches the divider 18 is from the left front side of the spoiler 16. When display segment 116 is activated then a "LEFT" indicator 120 and left arrow indicator 122 are illuminated. The display 110 may also include a display array for displaying distances in metric (not shown), such as in centimeters.

The digital display 110 normally displays a clock 112, but when the vehicle 10 slows to approximately two or three miles per hour and/or senses or detects an object at about eighteen inches then the display converts to a distance-from-object-detected display (in inches) 114. When the device senses an object at about ten inches from the spoiler 16 an alarm indicator 128 will illuminated on the display 114. When the device senses an object at about six inches from the spoiler 16 the digital display 114 will illuminate a "STOP" indicator 130.

As shown in FIG. 1, and as discussed above, the operator of the vehicle is given an audible warning when the divider 18 reaches a predetermined distance from the spoiler 16. This predetermined distance is ten (10) inches. The audible warning signal is delivered to the operator whenever any pair of optical sensor units detects an object at the range of ten (10) inches. Therefore, the first front pair of optical sensors to detect the divider 18 at ten (10) inches as determined by the microprocessor 100, causes the microprocessor 100 to output a signal along line 101 which activates an audible warning unit 102 connected thereto, thereby generating a loud and continuous pulsating audible warning signal. When the optical sensors detect the divider 18 at about six (6) inches from the spoiler 16 as determined by the microprocessor 100, causes the microprocessor 100 to output a signal along line 101 which activates an audible warning unit 102 connected thereto, thereby generating a loud and steady audible warning signal.

Each time a respective pair of optical sensing units detects a solid object within eighteen (18) inches, the corresponding light 106 or 107 is activated and the corresponding segment display 116 or 118 continuously indicates the detected distance from the solid object as the solid object moves relative to the respective pair of optical sensor units. This data could be updated at predetermined intervals, such as every second, thereby causing the respective segment display to change every second as the relative distance from the solid object and optical sensor units change. The interval distance as measured by the present invention is one inch intervals although the display unit could easily be modified to display one-tenth of one inch intervals. If the solid object moves beyond the eighteen inches from a pair of optical sensing units, the respective light 106 or 107 is deactivated and the respective segment display 116 or 118 is also deactivated and returns to the normal clock mode. If none of the pairs of optical sensing units detects a solid object within eighteen (18) inches, all of the lights 106 and 107 as well as all of the display segments 116 and 118 are deactivated and the normal clock mode is displayed on the digital display 110.

The audible warning unit 102 is activated by the microprocessor 100 continuously during parking unless the unit is deactivated via switch (not shown) or the car ignition is turned off or the car 10 exceeds a speed of three miles per hour or an object is no longer detected within ten inches of the car 10. Alternatively, the microprocessor 100 could maintain the audible signal for a predetermined period of time, possibly equal to the average amount of time needed to park a car, and then automatically deactivate itself after that time period has expired. The first pair of optical sensor units to detect a solid object within ten inches causes the microprocessor 100 to activate the audible warning unit 102 via line 101. The audible warning unit 102 then generates a pulsating audible warning signal. When the device senses an object at about six inches from the spoiler 16 the audible warning unit 102 then generates a steady audible warning signal.

The display 110 is made from seven segment light emitting diode displays or seven segment liquid crystal displays as are well known in the art. By delivering an indication to the operator of the vehicle 10 of the exact distance a solid object is located near the front portion of the vehicle 10 during parking, the operator is better able to park the car 10 within the parking space. As discussed above, the operator of the car can use the distance data to park the car totally within the parking space during front end parking where a divider or wall is in front of the parking space. Generally, the divider or wall in front of a parking space has solid surfaces perpendicular to the direction a car would enter the parking space. In this manner, the two front pair of optical sensor units can be used to determine how perpendicular the car 10 is being parked in the parking space. When the display segment 116 and 118 indicate the same distance from the solid object in front of the car 10, the car is parked perpendicularly to the wall or divider, and therefore, the car is parked parallel to the parking lines.

It is to be understood that the present invention is not limited to the sole embodiment described above, but encompasses any and all embodiments within the scope of the following claims.

I claim:

1. An electronic curb feeler system for detecting a solid object within a predetermined distance from a front end of a vehicle having a right and left side, said electronic curb feeler system comprising:

a right front pair of optical sensor units located on said front end of said vehicle in proximity to said right side thereof;

a left front pair of optical sensor units located on said front end of said vehicle in proximity to said left side thereof;

a microprocessor having connections to said right front and said left front pairs of optical sensor units for detecting the distance of a solid object within a first predetermined range thereof;

each said right front pair of optical sensing units and said left front pair of optical sensing units includes an optical transmitter for emitting light at a predetermined frequency and an optical detector for detecting a light at said predetermined frequency incident thereon, wherein said detector outputs a signal to said microprocessor indicative of the amount of light at said predetermined frequency incident on said optical detector;

an audible warning unit for generating an audible warning signal which can be heard by an operator of said vehicle;

a first visual display having a first and second light indicator; and a second visual display having a first numeric display and a second numeric display, wherein said microprocessor controls said first and second visual display to indicate the location and distance of a solid object in the proximity of said front end of said vehicle once said object is within said first predetermined range of said front end, said microprocessor also controlling said audible warning unit to generate a first audible warning signal for a predetermined amount of time after said solid object is first detected within a second predetermined range of said front end, and said microprocessor further controls said audible warning unit to generate a second audible warning signal and said second visual display to generate a visual warning signal when said solid object is detected within a third predetermined range of said front end.

2. A method of front end parking a vehicle into a parking space perpendicular to a solid object, said method comprising the steps of:

detecting when the solid object is within a predetermined distance to a right portion of the front end of the vehicle or a left portion of the front end of the vehicle;

indicating to an operator of the vehicle a first distance a right portion of the front end of the vehicle is from the solid object at one tenth of an inch intervals once the solid object is within the predetermined distance to the right portion of the front end of the vehicle as determined by said detecting step;

indicating to the operator of the vehicle a second distance a left portion of the front end of the vehicle is from the solid object at predetermined intervals once the solid object is within the predetermined distance to the left portion of the front end of the vehicle as determined by said detecting step; and controlling the vehicle during said front end parking so that said first distance and said second distance are approximately the same distance.

* * * * *